US009804656B2

United States Patent
Hurd et al.

(10) Patent No.: US 9,804,656 B2
(45) Date of Patent: Oct. 31, 2017

(54) MICRO-ARCHITECTURAL ENERGY MONITOR EVENT-ASSISTED TEMPERATURE SENSING

(71) Applicant: Intel Corporation, Santa Clara, CA (US)

(72) Inventors: Linda L. Hurd, Cool, CA (US); Eric C. Samson, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 313 days.

(21) Appl. No.: 13/631,930

(22) Filed: Sep. 29, 2012

(65) Prior Publication Data

US 2014/0095912 A1    Apr. 3, 2014

(51) Int. Cl.
| | | |
|---|---|---|
| G06F 1/00 | (2006.01) | |
| G06F 1/32 | (2006.01) | |
| G06F 1/20 | (2006.01) | |

(52) U.S. Cl.
CPC ............ *G06F 1/3234* (2013.01); *G06F 1/206* (2013.01); *G06F 1/3203* (2013.01); *G06F 1/3206* (2013.01); *G06F 1/3215* (2013.01); *G06F 1/3287* (2013.01); *Y02B 60/1275* (2013.01); *Y02B 60/1282* (2013.01)

(58) Field of Classification Search
CPC ..... G06F 1/3203; G06F 1/3215; G06F 1/3287
See application file for complete search history.

(56) References Cited

U.S. PATENT DOCUMENTS

| | | | | |
|---|---|---|---|---|
| 7,730,261 | B1 * | 6/2010 | Yung et al. ................. | 711/130 |
| 7,882,369 | B1 * | 2/2011 | Kelleher et al. ............. | 713/300 |
| 2002/0019949 | A1 * | 2/2002 | Meynard ..................... | 713/300 |
| 2005/0120254 | A1 * | 6/2005 | Suzuoki ................ | G06F 1/206 |
| | | | | 713/320 |
| 2006/0171244 | A1 * | 8/2006 | Ando ................. | G06F 12/0897 |
| | | | | 365/52 |
| 2008/0162972 | A1 * | 7/2008 | Liu ........................ | G06F 1/206 |
| | | | | 713/324 |
| 2009/0001814 | A1 * | 1/2009 | Subramaniam ............... | 307/39 |
| 2009/0006871 | A1 * | 1/2009 | Liu ....................... | G06F 1/3203 |
| | | | | 713/300 |
| 2010/0115304 | A1 * | 5/2010 | Finkelstein et al. ......... | 713/320 |
| 2010/0268997 | A1 * | 10/2010 | Planki .................... | G06F 1/206 |
| | | | | 714/47.1 |

(Continued)

OTHER PUBLICATIONS

Office Action received for U.S. Appl. No. 13/631,913, dated Nov. 11, 2014.

(Continued)

*Primary Examiner* — Mohammed Rehman
*Assistant Examiner* — Gayathri Sampath
(74) *Attorney, Agent, or Firm* — Alpine Technology Law Group LLC

(57) ABSTRACT

Methods and apparatus relating to micro-architectural energy monitor event-assisted temperature sensing are described. In one embodiment, at least one of a plurality of slices of a computational logic or at least one of a plurality of sub-slices of the computational logic are powered down or powered up based on a comparison of a temperature value, that is determined based on one or more micro-architectural events, and a threshold value. Other embodiments are also disclosed and claimed.

33 Claims, 5 Drawing Sheets

(56) References Cited

U.S. PATENT DOCUMENTS

| | | | |
|---|---|---|---|
| 2012/0066535 A1* | 3/2012 | Naffziger | G06F 1/206 713/340 |
| 2013/0015904 A1* | 1/2013 | Priel et al. | 327/419 |
| 2013/0073875 A1* | 3/2013 | Anderson | G06F 1/3293 713/300 |
| 2013/0079946 A1* | 3/2013 | Anderson | G06F 1/3228 700/299 |
| 2013/0205092 A1* | 8/2013 | Roy et al. | 711/130 |
| 2014/0089699 A1* | 3/2014 | O'Connor et al. | 713/322 |
| 2014/0092106 A1 | 4/2014 | Hurd et al. | |
| 2014/0095906 A1 | 4/2014 | Hurd | |

OTHER PUBLICATIONS

Office Action received for U.S. Appl. No. 13/631,931, dated Mar. 6, 2015.

* cited by examiner

MICRO-ARCHITECTURAL ENERGY MONITOR EVENT-ASSISTED TEMPERATURE SENSING

FIELD

The present disclosure generally relates to the field of electronics. More particularly, an embodiment of the invention relates to micro-architectural energy monitor event-assisted temperature sensing.

BACKGROUND

As integrated circuit (IC) fabrication technology improves, manufacturers are able to integrate additional functionality onto a single silicon substrate. As the number of these functionalities increases, however, so does the number of components on a single IC chip. Additional components add additional signal switching, in turn, generating more heat. The additional heat may damage an IC chip by, for example, thermal expansion. Also, the additional heat may limit usage locations and/or applications of a computing device that includes such chips. For example, a portable computing device may solely rely on battery power. Hence, as additional functionality is integrated into portable computing devices, the need to reduce power consumption becomes increasingly important, for example, to maintain battery power for an extended period of time. Non-portable computing systems also face cooling and power generation issues as their IC components use more power and generate more heat.

One type of component that tends to use a significant amount of power is the graphics circuitry included on some integrated circuit chips. Hence, controlling the power consumption of the graphics circuitry may have a direct effect on overall system power consumption.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
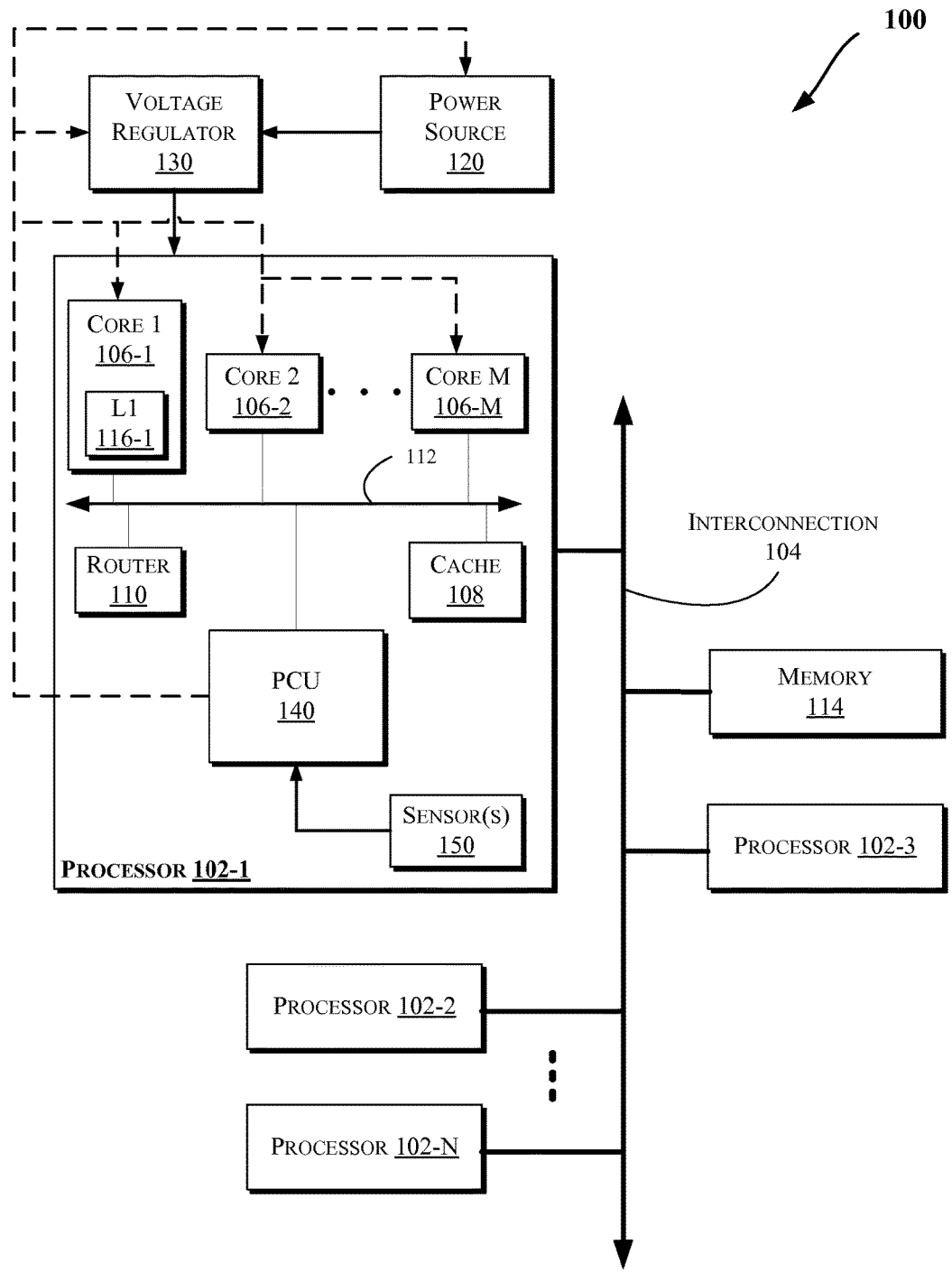
FIGS. 1, 4, and 5 illustrate block diagrams of embodiments of computing systems, which may be utilized to implement various embodiments discussed herein.

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

Some embodiments provide for temperature sensing, at least in part, based on micro-architectural energy monitor event(s) to achieve a relatively more accurate average temperature estimation. For example, such techniques for temperature sensing may improve the ability to decide when to take certain power management actions, such as when to power down or shut down a slice or sub-slice of a graphics logic (e.g., by turning off the supply of power provided/gated through a power transistor or other power gating device) and when to enable graphics logic (GT) or portions of graphics logic (such as graphics slice(s) or sub-slice(s) including those discussed with reference to FIG. 2, for example) on various computing platforms. Furthermore, as discussed herein, a graphics module or graphics logic may include one or more portions also referred to as slice(s), where each slice may include one or more sub-slices. Also, each "sub-slice" may include one or more: computational unit(s) (also referred to as EUs), texture sampler logic (more generally referred to as a "sampler" or "texture sampler"), a data cluster(s), data port(s), etc.

Generally, a micro-architectural event generally refers to an event that is supported or otherwise detected and/or handled by the micro-architecture in a computing device. Moreover, a micro-architectural event may be an event that is supported or otherwise detected and/or handled by the hardware, e.g., through an instruction set. In various embodiments, micro-architectural event(s) may relate to activity information within components of a computing system. For example, micro-architectural events may indicate when a component (e.g., portion(s) of a logic in a processor) is active (and using power and/or generating heat), the level of such activity, etc.

Furthermore, as discussed herein, a graphics module or graphics logic may include one or more slices, where each slice may include one or more sub-slices. Also, each "sub-slice" may include one or more: computational unit(s) (also referred to as EUs), texture sampler logic (more generally referred to as a "sampler" or "texture sampler"), a data cluster(s), and/or data port(s). Each EU may in turn include a plurality of (e.g., four) processing elements (such as ALUs (Arithmetic Logic Units), which may perform the role of shader processor(s)). In various embodiments, the EU may be any type of a processing elements such as any of the processors discussed herein (including for example a graphics processor or Graphics Processing Unit (GPU)). Such embodiments may more efficiently utilize the available graphics power budget, e.g. within the frequency scaling range, in some low-power consumption computing platforms, such as ULT (Ultrabook) or ultra-mobile products or any other products which use multiple sub-slices (e.g., having GT3, GT4, GT5, etc. graphics modules or graphics logic), whether or not the graphic modules/logic are integrated (i.e., into the same IC chip as a processor) or discrete (i.e., on a separate IC chip as a processor). As discussed herein, "GT" generally refers to a graphics module or graphics logic (such as a GPU, a general-purpose processor, etc.) that performs one or more graphics-related computations such as High Definition (HD) and non-HD graphics computations and/or operation(s) that manipulate an image, frame, scene, etc., e.g., as will be further discussed here. The GT may include a plurality of sub-slices and/or EUs.

Moreover, the scenes, images, or frames discussed herein (e.g., which may be processed by the graphics logic in various embodiments) may be captured by an image capture device (such as a digital camera (that may be embedded in another device such as a smart phone, a tablet, a laptop, a stand-alone camera, etc.) or an analog device whose captured images are subsequently converted to digital form). Moreover, the image capture device may be capable of capturing multiple frames in an embodiment. Further, one or more of the frames in the scene are designed/generated on a computer in some embodiments. Also, one or more of the frames of the scene may be presented via a display (such as the display discussed with reference to FIGS. 4 and/or 5, including for example a flat panel display device, etc.).

Also, some embodiments are performed based on one or more of: GT power consumption, GT average temperature, and/or temperature values in sub-slices (where a plurality of sub-slices, slice common logic, and L3$ (third level cache) form a slice of a GT, see, e.g., FIG. 2). Furthermore, some embodiments provide power performance efficiency (e.g., in products with multiple slices such as GT3, GT4, GT5, etc. graphics modules or graphics logic) by leveraging one or more of: (1) the temperature dependency of leakage power; (2) the average temperature of GT slices during turbo and non-turbo scenario(s); (3) power leakage/consumption differential between adjacent GT frequency bins (which may be a small power differential) and for example in frequency scaling range of operation; and/or (4) the ratio of leakage to dynamic power within the allotted GT power budget. Generally, a turbo operation (also referred to as turbo boost) allows processor core(s) to run faster than the base operating frequency (for a period of time) if they are operating below power, current, and/or temperature specification limits.

In an embodiment, logic (e.g., PCU logic 140 of FIG. 1, for example through the voltage regulator 130 of FIG. 1) determines when to power down or to enable one or more graphics logic slices based on an average temperature value, e.g. detected at sensor(s) 150 of FIG. 1 (e.g., at sub-slice(s)/EU(s) or slice(s) of a GT), which may be further augmented based on information obtained through microarchitectural event(s). For example, this allows for a more intelligent decision to be made to determine when to configure a graphics logic with a plurality of slices active versus with only one slice active. The average temperature value may also be used to improve estimation of the leakage component of the maximum GT operating current (Icc_max).

Moreover, some embodiments may be applied in computing systems that include one or more processors (e.g., with one or more processor cores), such as those discussed with reference to FIGS. 1-5, including for example mobile computing devices such as smart phones, tablets, portable game consoles, etc.). More particularly, FIG. 1 illustrates a block diagram of a computing system 100, according to an embodiment of the invention. The system 100 may include one or more processors 102-1 through 102-N (generally referred to herein as "processors 102" or "processor 102"). The processors 102 may be general-purpose CPUs and/or GPUs in various embodiments. The processors 102 may communicate via an interconnection or bus 104. Each processor may include various components some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106," or "core 106"), a cache 108, and/or a router 110. The processor cores 106 may be implemented on a single integrated circuit (IC) chip. Moreover, the chip may include one or more shared and/or private caches (such as cache 108), buses or interconnections (such as a bus or interconnection 112), graphics and/or memory controllers (such as those discussed with reference to FIGS. 4-5), or other components.

In one embodiment, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The cache 108 may store data (e.g., including instructions) that are utilized by one or more components of the processor 102-1, such as the cores 106. For example, the cache 108 may locally cache data stored in a memory 114 for faster access by the components of the processor 102 (e.g., faster access by cores 106). As shown in FIG. 1, the memory 114 may communicate with the processors 102 via the interconnection 104. In an embodiment, the cache 108 (that may be shared) may be a mid-level cache (MLC), a last level cache (LLC), etc. Also, each of the cores 106 may include a level 1 (L1) cache (116-1) (generally referred to herein as "L1 cache 116") or other levels of cache such as a level 2 (L2) cache. Moreover, various components of the processor 102-1 may communicate with the cache 108 directly, through a bus (e.g., the bus 112), and/or a memory controller or hub.

The system 100 may also include a power source 120 (e.g., a direct current (DC) power source or an alternating current (AC) power source) to provide power to one or more components of the system 100. In some embodiments, the power source 120 may include one or more battery packs and/or power supplies. The power source 120 may be coupled to components of system 100 through a voltage regulator (VR) 130. Moreover, even though FIG. 1 illustrates one power source 120 and one voltage regulator 130, additional power sources and/or voltage regulators may be utilized. For example, each of the processors 102 may have corresponding voltage regulator(s) and/or power source(s). Also, the voltage regulator(s) 130 may be coupled to the processor 102 via a single power plane (e.g., supplying power to all the cores 106) or multiple power planes (e.g., where each power plane may supply power to a different core, group of cores, or different sub-slices/EUs discussed herein). Power source may be capable of driving variable voltage or have different power drive configurations. In an embodiment, power may be supplied to each sub-slice/EU discussed herein via a power-gating logic (such as a power transistor) to allow for powering down or up of each sub-slice/EU individually as will be further discussed herein.

Additionally, while FIG. 1 illustrates the power source 120 and the voltage regulator 130 as separate components, the power source 120 and the voltage regulator 130 may be integrated and/or incorporated into other components of system 100. For example, all or portions of the VR 130 may be incorporated into the power source 120 and/or processor 102. Furthermore, as shown in FIG. 1, the power source 120 and/or the voltage regulator 130 may communicate with the power control logic 140 and report their power specification.

As shown in FIG. 1, the processor 102 may further include a Power Control Unit (PCU) logic 140 to control supply of power to one or more components of the processor 102 (e.g., cores 106, slices, sub-slices, EUs, etc.). Logic 140 may have access to one or more storage devices discussed herein (such as cache 108, L1 cache 116, memory 114, register(s), or another memory in system 100) to store information relating to operations of the PCU logic 140 such as information communicated with various components of system 100.

As shown, the logic 140 may be coupled to the VR 130 and/or other components of system 100 such as the cores 106 and/or the power source 120. For example, the PCU logic 140 may be coupled to receive information (e.g., in the form of one or more bits or signals) including information regarding micro-architectural event(s) and/or information regarding temperature measurements by one or more sensors 150 (where the sensor(s) 150 may be located proximate to (or otherwise physically coupled to) one or more components of system 100 (or other computing systems discussed herein such as those discussed with reference to other FIGS. including 2-5, for example), such as one or more of the cores 106, interconnections 104 or 112, slices, sub-slice(s)/EU(s) of FIG. 2, etc., to sense variations in various factors affecting power/thermal behavior of the system, such as temperature, operating frequency, operating voltage, operating current, dynamic capacitance, power consumption, inter-core communication activity, etc.). In an embodiment, one or more of the sensors 150 are implemented as remote diodes that sense temperature. Also, even though cores 106 are shown to be processor cores, these can be other computational element such as graphics cores, special function devices, GT(s), etc.

Figure 2:
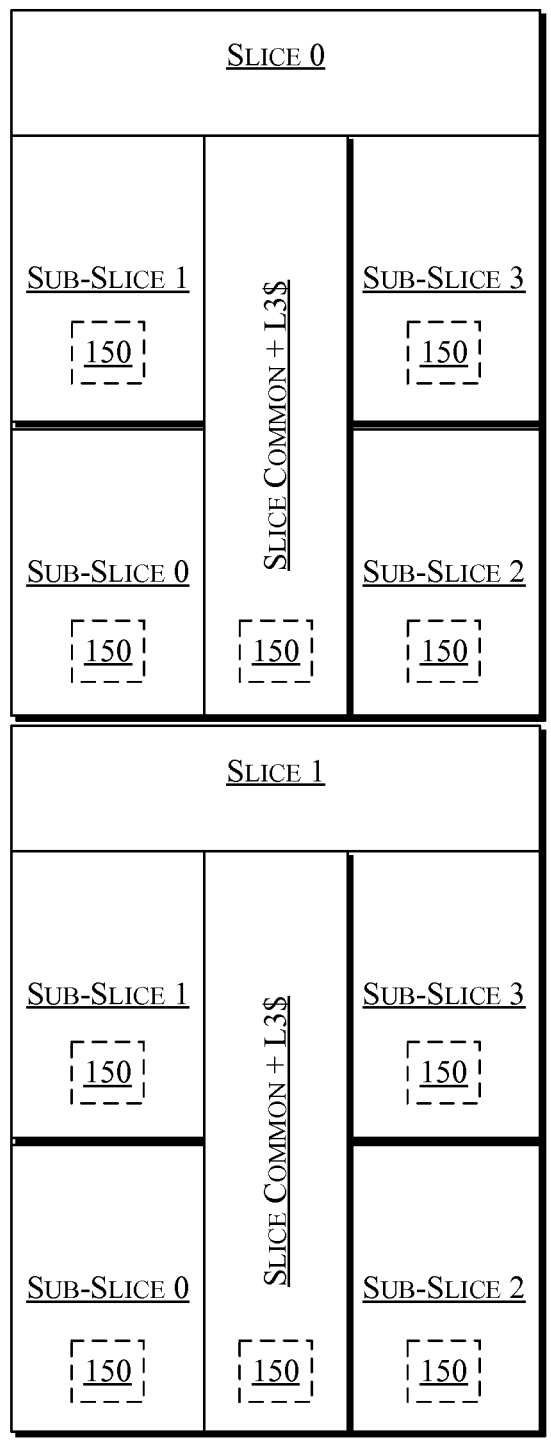
FIG. 2 illustrates a block diagram of a graphics logic, according to an embodiment.

FIG. 2 illustrates a block diagram of a graphics logic capable of temperature sensing based, at least in part, on micro-architectural energy monitor event(s), according to an embodiment. As shown, each GT may have two slices (labeled slice 0 and slice 1), where each slice in turn includes four sub-slices (labeled sub-slice 0 to sub-slice 3). However, embodiments are not limited to four sub-slices and more or less sub-slices may be present in each slice of GT. Also, each slice may include an unslice including a slice common logic (e.g., to perform operations common to the sub-slices/slice) and L3$ (e.g., to store information/data) as shown in FIG. 2.

As shown in the example of FIG. 2, logic (e.g., PCU 140 via VR 130) dynamically changes which slice or sub-slice (or EU) is power gated in a GT. In one embodiment, the shutting down of one or more sub-slices or slices at a crossover temperature point/value allows for a more accurate control of power budget. As discussed herein, a crossover temperature point/value refers to a point where a decision may be made to shut down/up a portion of graphics logic (such as slice(s) or sub-slice(s)) to efficiently utilize the power budget allotted the graphics logic. The shutting down of the slice(s) or sub-slice(s) could be done at frame boundary, such as when the GT is done performing its assigned task(s) (i.e., has no remaining work to be done). It may also be done at intra-frame (i.e., partway through a frame), which would require more control logic to support at the sub-slice level. For EUs, the shutdown may be done either at frame boundary or intra-frame (e.g., allowing the work on EU drain out/complete before performing the shutdown/rotation). Moreover, the power down operation is accomplished by power-gating or FIVR shutdown (where "FIVR" refers to a Fully Integrated Voltage Regulator) in some embodiments.

Figure 3:
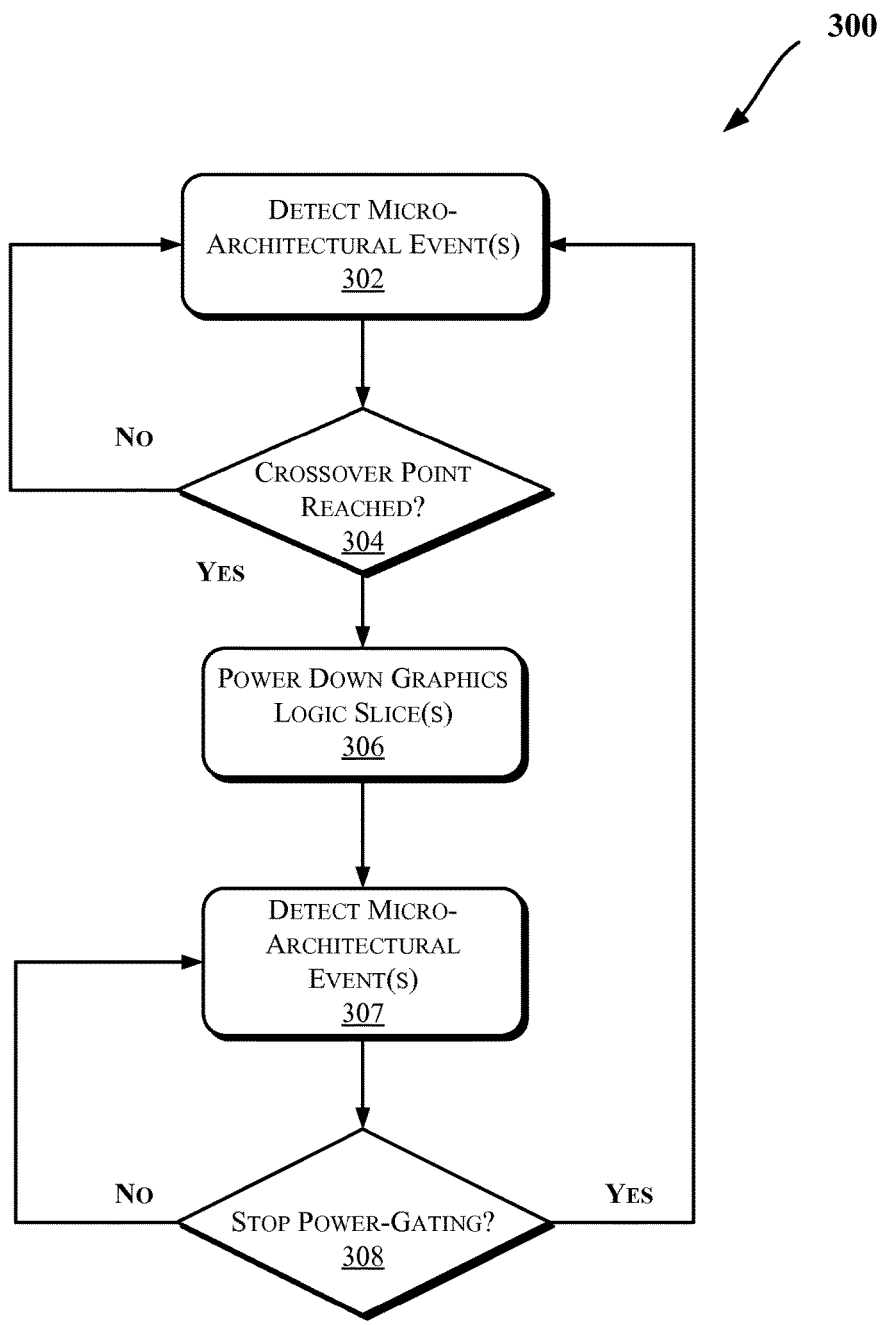
FIG. 3 illustrates a flow diagram of a method, according to an embodiment.

FIG. 3 illustrates a flow diagram of a method 300 to provide for temperature sensing based, at least in part, on micro-architectural energy monitor event(s), according to an embodiment. In some embodiments, various components discussed with reference to FIGS. 1-2 and 4-5 may be utilized to perform one or more of the operations discussed with reference to FIG. 3.

Referring to FIG. 3, at an operation 302, one or more micro-architectural events are detected (e.g., at logic 140). At an operation 304, if a threshold crossover temperature value associated with the event(s) of operation 302 (and/or temperature values detected at one or sensors 150) are reached, the method 300 continues with operation 306 that causes powering down/up of graphics logic (e.g., one or more slice(s) and/or sub-slice(s)) (e.g., as determined by PCU logic 140 of FIG. 1). At an operation 307, one or more micro-architectural events (and/or temperature values detected at one or sensors 150) are detected. At an operation 308, it is determined (e.g., by the logic 140) whether to stop the power-gating established at operation 306 (e.g., based on an indication that a select condition has been reached based on elapsed time (e.g., per expiration of a time (not shown) or based on reaching a threshold value indicating that power gating is no longer needed), conditions detected by sensor(s) 150 (e.g., reduced temperature at select component(s), e.g., detected temperatures have decreased below the crossover point of operation 304), etc. If so, method 300 resumes at operation 302; otherwise, method 300 resumes at operation 307.

For supporting the estimation of GT average temperature, it may be that no additional remote diodes (RDs) or sensors are needed beyond existing coverage provided in some products. In an embodiment, two RDs or sensors are provided for the unslice and two are provided per sub-slice. Also, an estimate average temperature is provided for each of the unslice, slice 0, and slice 1 in some embodiments.

In some embodiments, the average temperature could be estimated by providing a weight for the temperature sensed from each of the RDs/sensors and then determining a sum of products value as follows:

---

GT_unslice AVG Temp = W1_unslice*TempRD1_unslice + W2_unslice*TempRD2_unslice
GT_slice0 AVG Temp = W1_Slice0*TempRD1_Slice0 + W2_Slice0*TempRD2_Slice0 + ...... + Wn_Slice0*TempRDn_Slice0
GT_Slice1 AVG Temp = W1_Slice1*TempRD1_Slice1 + W2_slice1*TempRD2_Slice1 + ...... + Wn_slice1*TempRDn_Slice1

--- where AVG refers to an average value, Temp refers to a temperature value, W refers to weight values. In an embodiment, the weight values (Wn) would be dependent on the amount of Z in the area (zone of influence) covered by each RD (alternatively referred to as sensor herein).

In an embodiment the values for unslice may be determined with more accuracy by: (1) identifying micro-architectural events (such as performance monitoring tools including those that use EMON registers/counters) to reflect utilizations of key units in Media, VEBox (Video Encoder Box), VDBox (Video Decoder Box) and WIDI (Wireless Display) logic to augment the sum of products equation; and/or (2) using the temperature values sensed at the RD/sensor in each processor core which is closest to GT unslice and the temperatures sensed in the RDs/sensors of slice 0 or slice 1 whichever is closest to unslice to augment the sum of products equation.

In one embodiment the values for slice 0 and slice 1 may be determined with more accuracy by: (1) identifying micro-architectural events (e.g., via EMON) to reflect utilizations of key units in slice common and L3$ to augment the sum of products equation; and/or (2) adding one or two remote diodes or sensors in the slice common and/or L3$ areas and to update the sum of products equation to include the temperature value(s) from the additional sensor(s) or RD(s).

In an embodiment the values for slice 0 may be determined with more accuracy by using the temperature values sensed in the RDs of slice 1 which are closest to slice 0 to augment the sum of products equation (e.g., for when slice 1 is active and also when it is shutdown, as it may have some influence on slice 0's average temperature values).

In an embodiment the values for slice 1 may be determined with more accuracy by using the temperature values sensed in the RDs of EDRAMPIO (where EDRAMPIO refers to I/O logic for read or write access to an external DRAM (Dynamic Random Access Memory)) which are closest to slice 0 to augment the sum of products equation (e.g., for when EDRAMPIO is active and also when it is disabled, as it may have some influence on slice 1's average temperature values).

Furthermore, in some embodiments, logic (such as PCU 140) would need knowledge of GT average temperature in order to implement the power down/up techniques discussed herein, along with and indication of GT power consumption level.

Figure 4:
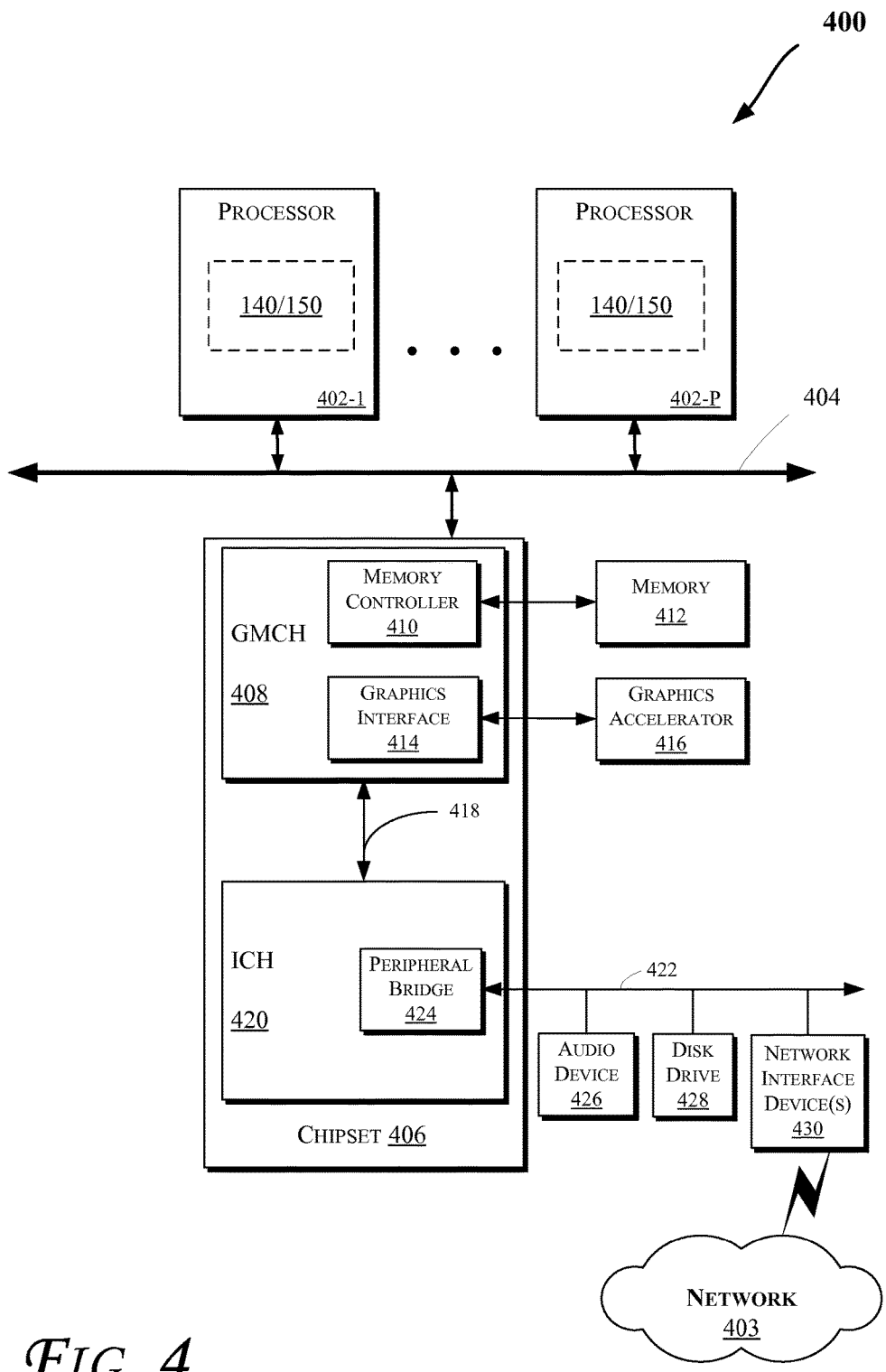

FIG. 4 illustrates a block diagram of a computing system 400 in accordance with an embodiment of the invention. The computing system 400 may include one or more central processing unit(s) (CPUs) or processors 402-1 through 402-P (which may be referred to herein as "processors 402" or "processor 402"). The processors 402 may communicate via an interconnection network (or bus) 404. The processors 402 may include a general purpose processor, a network processor (that processes data communicated over a computer network 403), or other types of a processor (including a reduced instruction set computer (RISC) processor or a complex instruction set computer (CISC)). Moreover, the processors 402 may have a single or multiple core design. The processors 402 with a multiple core design may integrate different types of processor cores on the same integrated circuit (IC) die. Also, the processors 402 with a multiple core design may be implemented as symmetrical or asymmetrical multiprocessors. In an embodiment, one or more of the processors 402 may be the same or similar to the processors 102 of FIG. 1. In some embodiments, one or more of the processors 402 may include one or more of the cores 106, logic 140, sensor(s) 150, of FIG. 1. Also, the operations discussed with reference to FIGS. 1-3 may be performed by one or more components of the system 400. For example, a voltage regulator (such as VR 130 of FIG. 1) may regulate voltage supplied to one or more components of FIG. 4 at the direction of logic 140.

A chipset 406 may also communicate with the interconnection network 404. The chipset 406 may include a graphics and memory control hub (GMCH) 408. The GMCH 408 may include a memory controller 410 that communicates with a memory 412. The memory 412 may store data, including sequences of instructions that are executed by the processor 402, or any other device included in the computing system 400. In one embodiment of the invention, the memory 412 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 404, such as multiple CPUs and/or multiple system memories.

The GMCH 408 may also include a graphics interface 414 that communicates with a graphics accelerator 416. In one embodiment of the invention, the graphics interface 414 may communicate with the graphics accelerator 416 via an accelerated graphics port (AGP). In an embodiment of the invention, a display (such as a flat panel display, a cathode ray tube (CRT), a projection screen, etc.) may communicate with the graphics interface 414 through, for example, a signal converter that translates a digital representation of an image stored in a storage device such as video memory or system memory into display signals that are interpreted and displayed by the display. The display signals produced by the display device may pass through various control devices before being interpreted by and subsequently displayed on the display.

A hub interface 418 may allow the GMCH 408 and an input/output control hub (ICH) 420 to communicate. The ICH 420 may provide an interface to I/O devices that communicate with the computing system 400. The ICH 420 may communicate with a bus 422 through a peripheral bridge (or controller) 424, such as a peripheral component interconnect (PCI) bridge, a universal serial bus (USB) controller, or other types of peripheral bridges or controllers. The bridge 424 may provide a data path between the processor 402 and peripheral devices. Other types of topologies may be utilized. Also, multiple buses may communicate with the ICH 420, e.g., through multiple bridges or controllers. Moreover, other peripherals in communication with the ICH 420 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 422 may communicate with an audio device 426, one or more disk drive(s) 428, and one or more network interface device(s) 430 (which is in communication with the computer network 403). Other devices may communicate via the bus 422. Also, various components (such as the network interface device 430) may communicate with the GMCH 408 in some embodiments of the invention. In addition, the processor 402 and the GMCH 408 may be combined to form a single chip. Furthermore, the graphics accelerator 416 may be included within the GMCH 408 in other embodiments of the invention.

Furthermore, the computing system 400 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 428), a floppy disk, a compact disk ROM (CD-ROM), a digital versatile disk (DVD), flash memory, a magneto-optical disk, or other types of nonvolatile machine-readable media that are capable of storing electronic data (e.g., including instructions). In an embodiment, components of the system 400 may be arranged in a point-to-point (PtP) configuration. For example, processors, memory, and/or input/output devices may be interconnected by a number of point-to-point interfaces.

Figure 5:
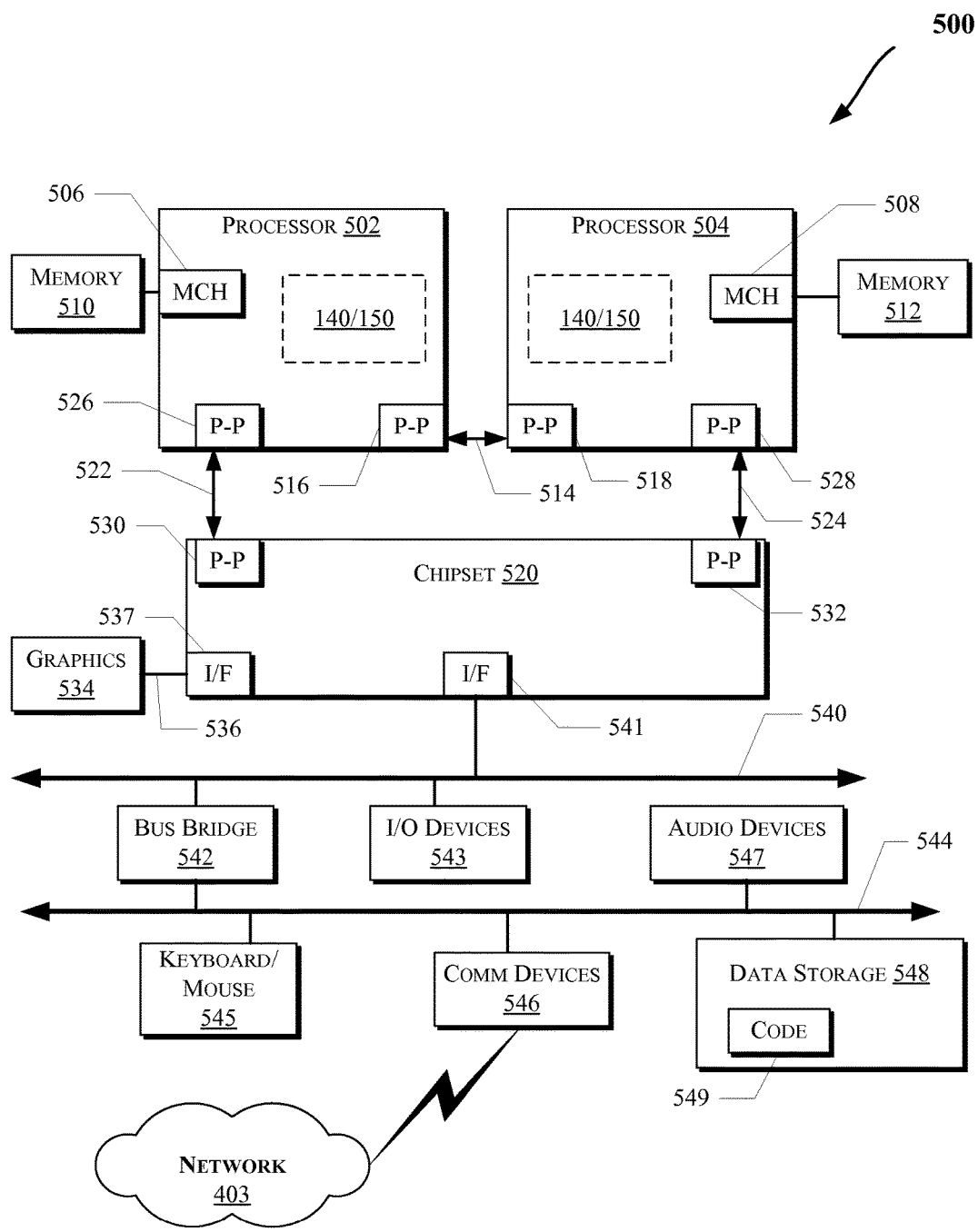

FIG. 5 illustrates a computing system 500 that is arranged in a point-to-point (PtP) configuration, according to an embodiment of the invention. In particular, FIG. 5 shows a system where processors, memory, and input/output devices are interconnected by a number of point-to-point interfaces. The operations discussed with reference to FIGS. 1-4 may be performed by one or more components of the system 500. For example, a voltage regulator (such as VR 130 of FIG. 1) may regulate voltage supplied to one or more components of FIG. 5.

As illustrated in FIG. 5, the system 500 may include several processors, of which only two, processors 502 and 504 are shown for clarity. The processors 502 and 504 may each include a local memory controller hub (MCH) 506 and 508 to enable communication with memories 510 and 512. The memories 510 and/or 512 may store various data such as those discussed with reference to the memory 412 of FIG. 4. Also, the processors 502 and 504 may include one or more of the cores 106, logic 140, and/or sensor(s) 150 of FIG. 1.

In an embodiment, the processors 502 and 504 may be one of the processors 402 discussed with reference to FIG. 4. The processors 502 and 504 may exchange data via a point-to-point (PtP) interface 514 using PtP interface circuits 516 and 518, respectively. Also, the processors 502 and 504 may each exchange data with a chipset 520 via individual PtP interfaces 522 and 524 using point-to-point interface circuits 526, 528, 530, and 532. The chipset 520 may further exchange data with a high-performance graphics circuit 534 via a high-performance graphics interface 536, e.g., using a PtP interface circuit 537.

In at least one embodiment, one or more operations discussed with reference to FIGS. 1-4 may be performed by the processors 502 or 504 and/or other components of the system 500 such as those communicating via a bus 540. Other embodiments of the invention, however, may exist in other circuits, logic units, or devices within the system 500 of FIG. 5. Furthermore, some embodiments of the invention may be distributed throughout several circuits, logic units, or devices illustrated in FIG. 5.

Chipset 520 may communicate with the bus 540 using a PtP interface circuit 541. The bus 540 may have one or more devices that communicate with it, such as a bus bridge 542 and I/O devices 543. Via a bus 544, the bus bridge 542 may communicate with other devices such as a keyboard/mouse 545, communication devices 546 (such as modems, network interface devices, or other communication devices that may communicate with the computer network 403), audio I/O device, and/or a data storage device 548. The data storage device 548 may store code 549 that may be executed by the processors 502 and/or 504.

In various embodiments of the invention, the operations discussed herein, e.g., with reference to FIGS. 1-5, may be implemented as hardware (e.g., logic circuitry), software, firmware, or combinations thereof, which may be provided as a computer program product, e.g., including a tangible machine-readable or computer-readable medium having stored thereon instructions (or software procedures) used to program a computer to perform a process discussed herein. The machine-readable medium may include a storage device such as those discussed with respect to FIGS. 1-5.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. A processor comprising:
   computational logic having a plurality of slices and at least one unslice, wherein each of the plurality of slices is to comprise a plurality of sub-slices to perform one or more computations; and
   logic to cause at least one of the plurality of slices or at least one of the plurality of sub-slices to power down or power up based on a comparison of a temperature value, to be determined based on one or more micro-architectural events that are to indicate an active status and a level of activity within one or more components of the processor, and a threshold value, wherein the temperature value is to be determined based on a first temperature value, corresponding to the at least one of the plurality of slices or the at least one of the plurality of sub-slices, and a second temperature value for a neighboring slice or sub-slice, wherein the second temperature value is to correspond to an inactive temperature value of the neighboring slice or sub-slice, wherein the logic is to cause at least one of the plurality of slices or at least one of the plurality of sub-slices to power down or power up based at least in part on a ratio of leakage to dynamic power.

2. The processor of claim 1, wherein the one or more micro-architectural events are to be detected at the at least one of the plurality of slices or at the least one of the plurality of sub-slices.

3. The processor of claim 1, wherein the temperature value is to be determined based on a weighted sum of a plurality of temperature values.

4. The processor of claim 1, where in the unslice is to comprise a third level cache.

5. The processor of claim 1, wherein each sub-slice is to comprise one or more execution units.

6. The processor of claim 5, wherein each of the one or more execution units is to comprise a plurality of processing elements.

7. The processor of claim 6, wherein each of the plurality of processing elements is to comprise one or more ALUs (Arithmetic Logic Units), wherein each of the one or more ALUs is to perform the role of a shader processor.

8. The processor of claim 1, wherein the logic to cause the at least one of the plurality of slices or the at least one of the plurality of sub-slices to power down or power up is to operate based on information detected at one or more sensors.

9. The processor of claim 8, wherein the one or more sensors are to be located within the processor.

10. The processor of claim 8, wherein the one or more sensors are to comprise one or more remote diodes.

11. The processor of claim 8, wherein the one or more sensors are to detect variations in one or more of: temperature, operating frequency, operating voltage, operating current, dynamic capacitance, power consumption, or inter-core communication activity.

12. The processor of claim 8, wherein the one or more sensors are to be proximate to one or more of: the at least one of the plurality of slices, the unslice, and the at least one of the plurality of sub-slices.

13. The processor of claim 1, wherein the plurality of sub-slices are to perform one or more computations related to graphics operations.

14. The processor of claim 1, wherein the logic to cause the at least one of the plurality of slices or the at least one of the plurality of sub-slices to power down or power up is to cause the at least one of the plurality of slices or the at least one of the plurality of sub-slices to power up in response to expiration of a timer.

15. The processor of claim 1, wherein one or more of the computational logic, a voltage regulator, the logic to cause the at least one of the plurality of slices or the at least one of the plurality of sub-slices to power down or power up, or a memory are on a single integrated circuit die.

16. A method comprising:
   causing at least one of a plurality of slices of a computational logic or at least one of a plurality of sub-slices of the computational logic to power down or power up based on a comparison of a temperature value, to be determined based on one or more micro-architectural events that are to indicate an active status and a level of activity within one or more components to be coupled to the computational logic, and a threshold value,
   wherein the computational logic comprises at least one unslice, the plurality of slices and wherein each of the plurality of slices comprises a plurality of sub-slices to perform one or more computations, wherein the temperature value is determined based on a first temperature value, corresponding to the at least one of the plurality of slices or the at least one of the plurality of sub-slices, and a second temperature value for a neighboring slice or sub-slice, wherein the second temperature value corresponds to an inactive temperature value of the neighboring slice or sub-slice, wherein at least one of the plurality of slices or at least one of the plurality of sub-slices is powered down or powered up based at least in part on a ratio of leakage to dynamic power.

17. The method of claim 16, further comprising detecting the one or more micro-architectural events at the at least one of the plurality of slices or the least one of the plurality of sub-slices.

18. The method of claim 16, further comprising determining the temperature value based on a weighted sum of a plurality of temperature values.

19. The method of claim 16, wherein causing the at least one of a plurality of slices or the at least one of a plurality of sub-slices to power down or power up is performed based on information detected at one or more sensors.

20. The method of claim 16, further comprising powering up the at least one of a plurality of slices or the at least one of a plurality of sub-slices in response to expiration of a timer.

21. A system comprising:
   a processor having one or more processor cores;
   memory to store data to be accessed by at least one of the one or more processor cores;
   the processor comprising:
      computational logic having a plurality of slices and at least one unslice, wherein each of the plurality of slices is to comprise a plurality of sub-slices to perform one or more computations; and
      logic to cause at least one of the plurality of slices or at least one of the plurality of sub-slices to power down or power up based on a comparison of a temperature value, to be determined based on one or more micro-architectural events, and a threshold value, wherein the temperature value is to be determined based on a first temperature value, corresponding to the at least one of the plurality of slices or the at least one of the plurality of sub-slices, and a second temperature value for a neighboring slice or sub-slice, wherein the second temperature value is to correspond to an inactive temperature value of the neighboring slice or sub-slice, wherein the logic is to cause at least one of the plurality of slices or at least one of the plurality of sub-slices to power down or power up based at least in part on a ratio of leakage to dynamic power.

22. The system of claim 21, wherein the one or more micro-architectural events are to be detected at the at least one of the plurality of slices or at the at least one of the plurality of sub-slices.

23. The system of claim 21, wherein the temperature value is to be determined based on a weighted sum of a plurality of temperature values.

24. The system of claim 21, where in the at least one unslice is to comprise a third level cache.

25. The system of claim 21, wherein the logic to cause the at least one of the plurality of slices or the at least one of the plurality of sub-slices to power down or power up is to operate based on information detected at one or more sensors.

26. The system of claim 21, wherein the plurality of sub-slices are to perform one or more computations related to graphics operations on at least one frame of an image.

27. The system of claim 21, wherein the logic to cause the at least one of the plurality of slices or the at least one of the plurality of sub-slices to power down or power up is to cause the at least one of the plurality of slices or the at least one of the plurality of sub-slices to power up in response to expiration of a timer.

28. A non-transitory computer-readable medium comprising one or more instructions that when executed on a processor configure the processor to perform one or more operations to:
   cause at least one of a plurality of slices of a computational logic or at least one of a plurality of sub-slices of the computational logic to power down or power up based on a comparison of a temperature value, to be determined based on one or more micro-architectural events, and a threshold value,
   wherein the computational logic comprises at least one unslice, the plurality of slices and wherein each of the plurality of slices comprises a plurality of sub-slices to perform one or more computations wherein the temperature value is determined based on a first temperature value, corresponding to the at least one of the plurality of slices or the at least one of the plurality of sub-slices, and a second temperature value for a neighboring slice or sub-slice, wherein the second temperature value is to correspond to an inactive temperature value of the neighboring slice or sub-slice, wherein at least one of the plurality of slices or at least one of the plurality of sub-slices is caused to power down or power up based at least in part on a ratio of leakage to dynamic power.

29. The computer-readable medium of claim 28, wherein the one or more micro-architectural events are to be detected at the at least one of the plurality of slices or at the least one of the plurality of sub-slices.

30. The computer-readable medium of claim 28, further comprising one or more instructions that when executed on a processor configure the processor to perform one or more computations related to graphics operations.

31. The processor of claim 1, wherein the at least one unslice is to comprise memory and slice common logic, wherein the slice common logic is to perform one or more operations common to the plurality of slices or the plurality of sub-slices.

32. The processor of claim 1, wherein the one or more micro-architectural events are to be determined through an instruction set.

33. The apparatus of claim 1, wherein the neighboring slice or sub-slice is a closest slice or sub-slice to the at least one of the plurality of slices or the at least one of the plurality of sub-slices.

\* \* \* \* \*